United States Patent
Greywall et al.

(10) Patent No.: US 7,468,828 B2
(45) Date of Patent: Dec. 23, 2008

(54) SPOT ARRAY GENERATION USING A MEMS LIGHT MODULATOR

(75) Inventors: Dennis S. Greywall, White House Station, NJ (US); Dan M. Marom, Mevaseret Zion, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 63 days.

(21) Appl. No.: 11/550,867

(22) Filed: Oct. 19, 2006

(65) Prior Publication Data
US 2008/0094682 A1 Apr. 24, 2008

(51) Int. Cl.
*G02F 1/01* (2006.01)
*G02B 27/00* (2006.01)

(52) U.S. Cl. .................. 359/276; 359/279; 359/578

(58) Field of Classification Search .......... 359/260, 359/276, 279, 282, 290, 291, 578
See application file for complete search history.

(56) References Cited

U.S. PATENT DOCUMENTS

| | | | | |
|---|---|---|---|---|
| 3,955,880 A | * | 5/1976 | Lierke | 359/291 |
| 5,636,052 A | * | 6/1997 | Arney et al. | 359/291 |
| 5,808,780 A | * | 9/1998 | McDonald | 359/290 |
| 5,825,528 A | * | 10/1998 | Goossen | 359/291 |
| 6,674,562 B1 | * | 1/2004 | Miles | 359/291 |
| 7,397,018 B1 | * | 7/2008 | Pham et al. | 250/201.9 |
| 2006/0228896 A1 | | 10/2006 | Greywall | |

* cited by examiner

*Primary Examiner*—David N Spector

(57) ABSTRACT

An optical system having a spatial light modulator (SLM), in which each pixel has an optical cavity and is adapted to: (i) change the intensity of a reflected beam by changing the size of the cavity and (ii) change the phase of the reflected beam by changing the position of the cavity with respect to a reference plane. In one embodiment, the optical system has optics configured to image the apertures of an optical input mask onto the pixels of the SLM and to form an optical spot array by imaging the light reflected by the pixels onto a plane orthogonal to the plane of the mask. Each aperture can be configured to have a transmission pattern to spatially modulate the light imaged onto the corresponding pixel, thereby enabling control of the spatial mode at the corresponding spot in the optical spot array.

18 Claims, 9 Drawing Sheets

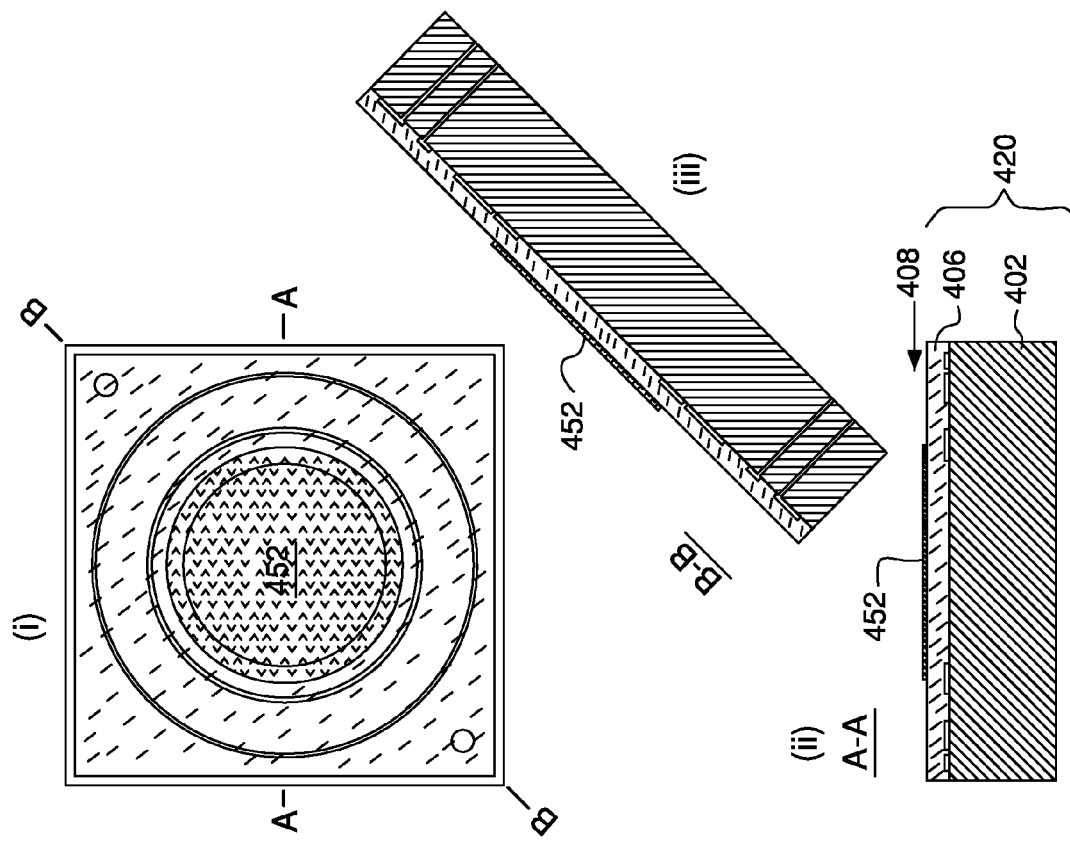
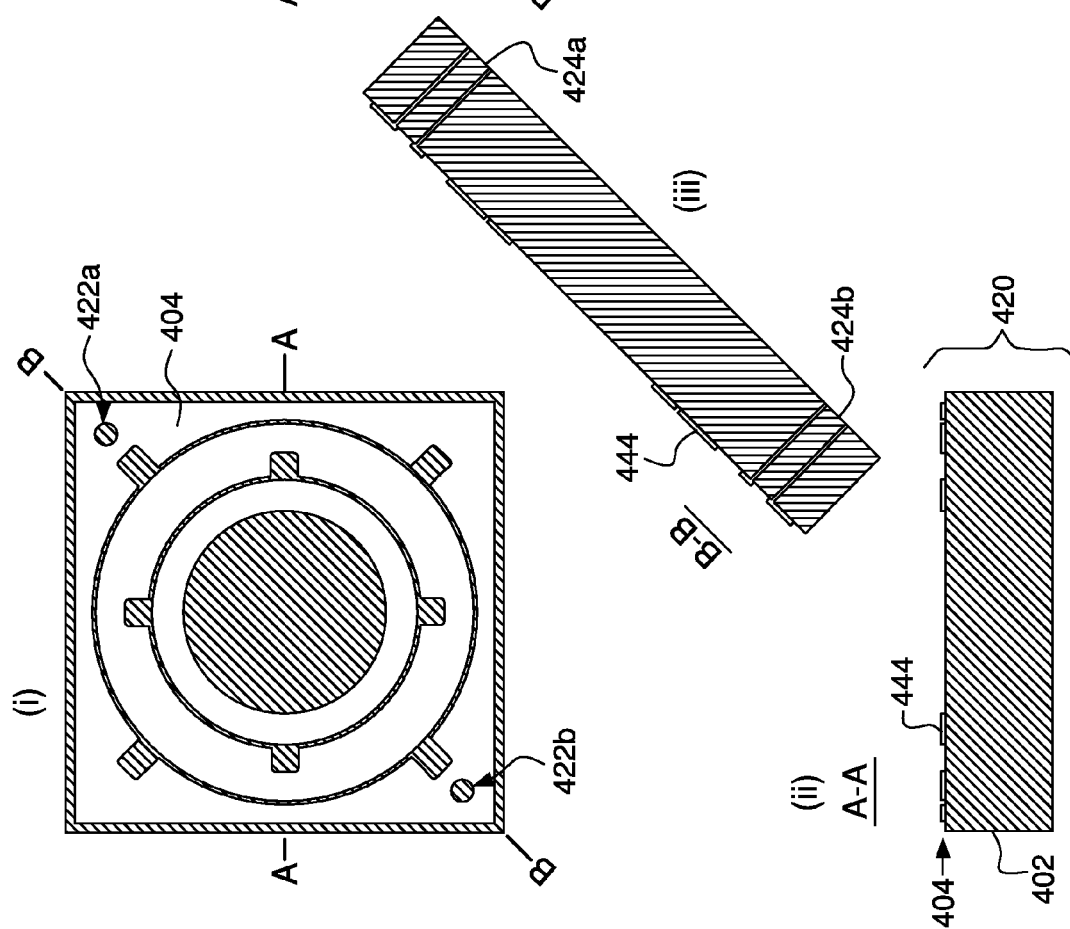

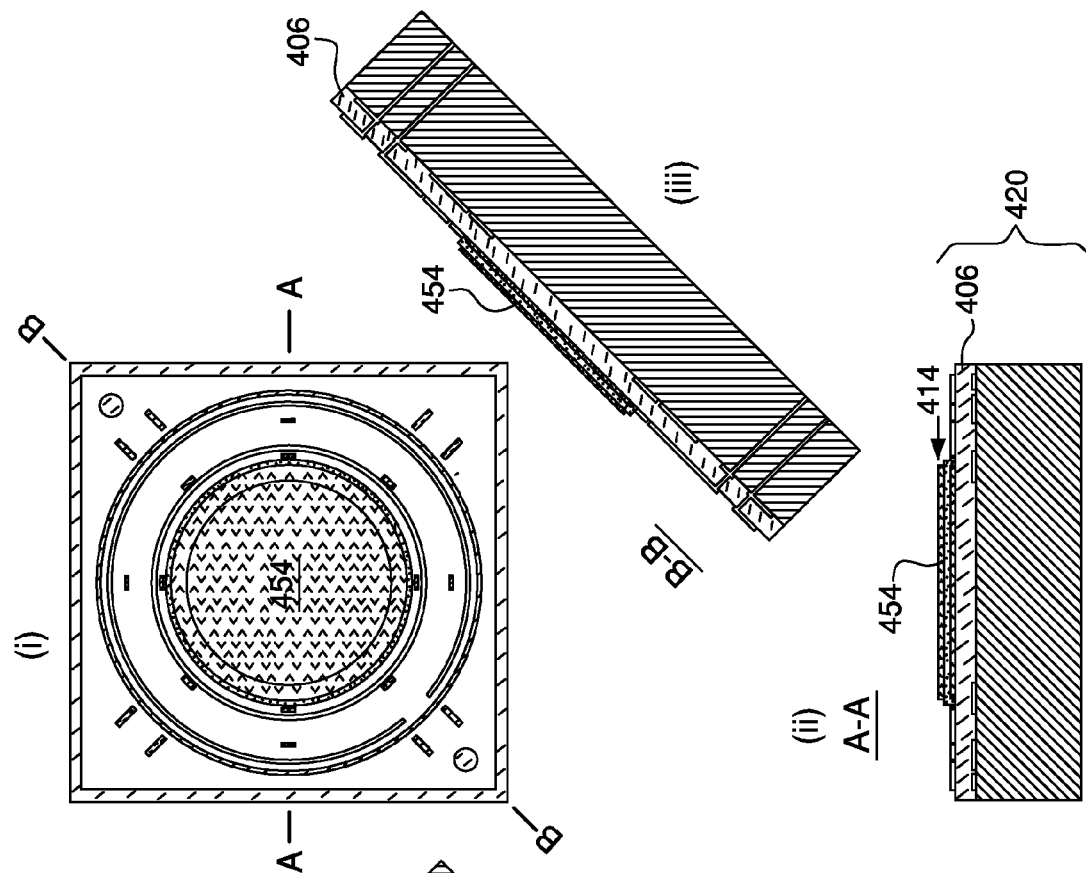
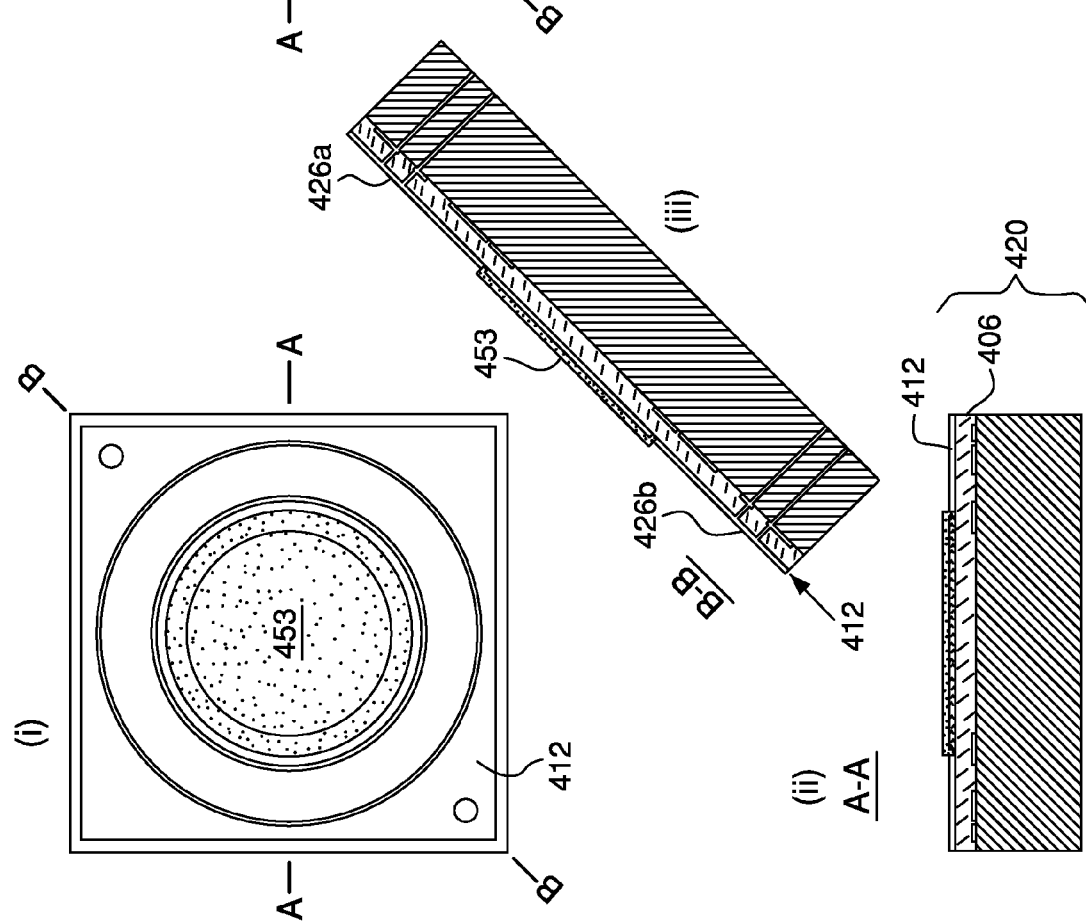

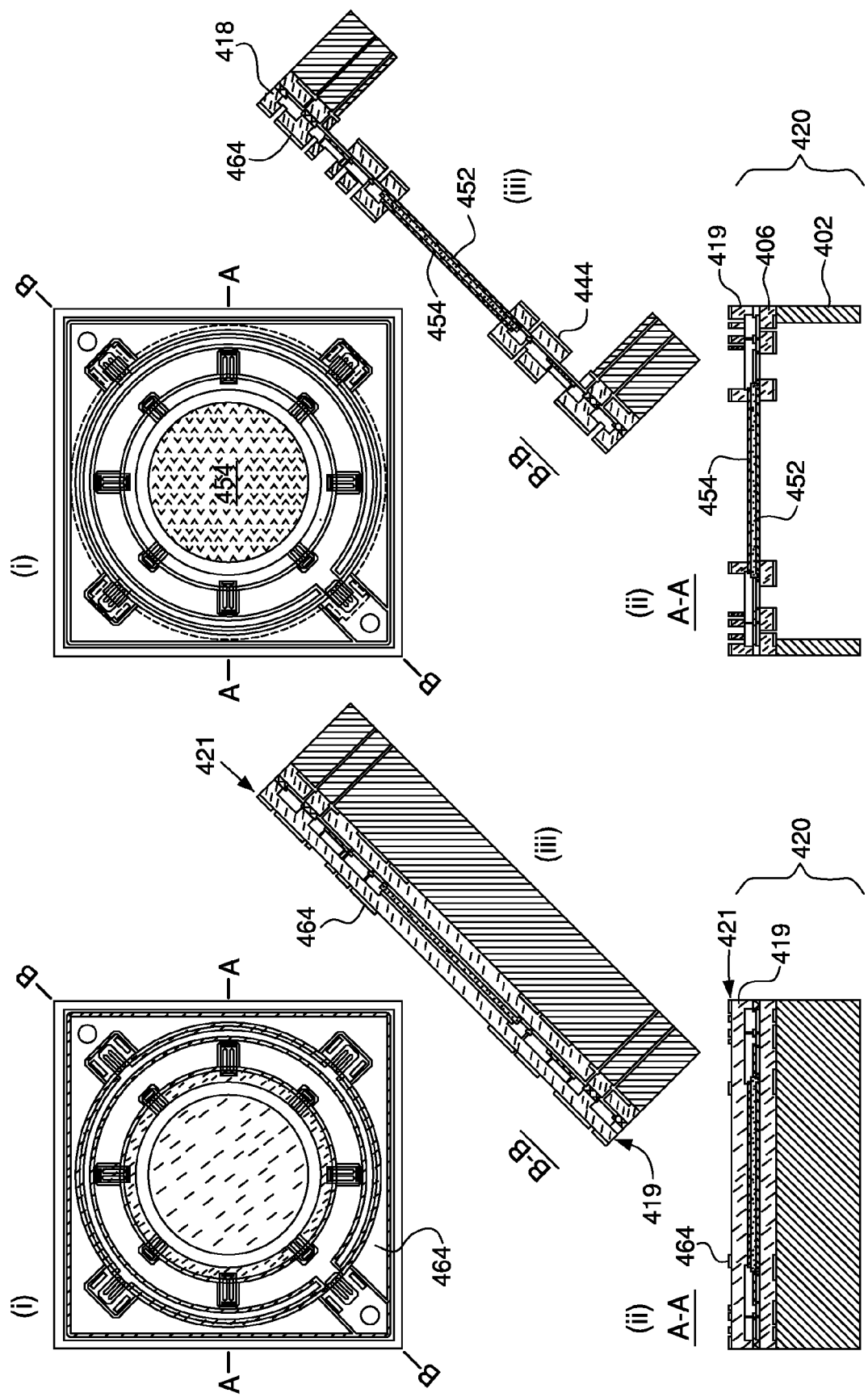

SPOT ARRAY GENERATION USING A MEMS LIGHT MODULATOR

BACKGROUND OF THE INVENTION

1. Field of the Invention

The present invention relates to spot array generation and, more specifically, to a spatial light modulator that can be used to generate a spot array with independent amplitude and phase control for the individual spots.

2. Description of the Related Art

One representative quantum system that can be used in quantum computing is an array of individually trapped ions. More specifically, each individual ion is set to a desired quantum state, with multiple ions forming a quantum ensemble representing a set of quantum bits (qubits). The qubits can then be individually manipulated in certain ways, with the resulting quantum state of the ensemble representing a result of the corresponding quantum computation.

One known way of setting a trapped ion to a desired quantum state is to subject the ion to a well-defined electromagnetic field, e.g., that of an optical beam. Thus, to manipulate an array of individually trapped ions under this approach, a multi-beam optical system enabled to individually and appropriately control each of its optical beams can be used. However, optical systems having these capabilities are not yet sufficiently developed.

SUMMARY OF THE INVENTION

Problems in the prior art are addressed by an optical system having an array of spatial light modulator (SLM) units, in which each SLM unit has two films arranged to define a tunable cavity. The films are mounted on a base so that (i) both films can be moved with respect to the base and (ii) at least one of the films can also be moved with respect to the other film. As a result, the optical system can: (i) change the intensity of a beam created by reflecting a beam incident on an SLM unit by changing the film separation in that SLM unit and (ii) change the phase of such a reflected beam by changing the position of the cavity defined by the two films in the SLM unit with respect to the base.

In one embodiment of the invention, the optical system includes an optical input mask, the apertures of which are imaged onto the SLM units, and the light reflected by the SLM units is imaged onto an image plane so as to form an optical spot array in that image plane. Each aperture of the input mask has a grayscale transmission pattern that spatially modulates the light passing through the aperture, thus defining the spatial intensity profile at the corresponding spot in the optical spot array. As a result, in addition to the intensity and phase control, the optical system defines the spatial intensity profile of the spots at the image plane by the apertures' grayscale transmission pattern.

Advantageously, an optical system arranged according to the principles of the invention can be used to manipulate trapped ions in a qubit processor by subjecting each trapped ion to the individually controlled, well-defined electromagnetic field of a respective optical beam. Each optical beam induces a corresponding trapped ion to acquire a selected quantum state. By placing different trapped ions into respective selected quantum states, the optical system thus prepares a quantum ensemble suitable for effecting quantum computations in the qubit processor.

BRIEF DESCRIPTION OF THE DRAWINGS

FIGS. 4A-K schematically illustrate representative fabrication steps for a MEMS device that can be used as each pixel of the SLM employed in the optical system of FIG. 1 according to yet another embodiment of the invention.

DETAILED DESCRIPTION

Figure 1:
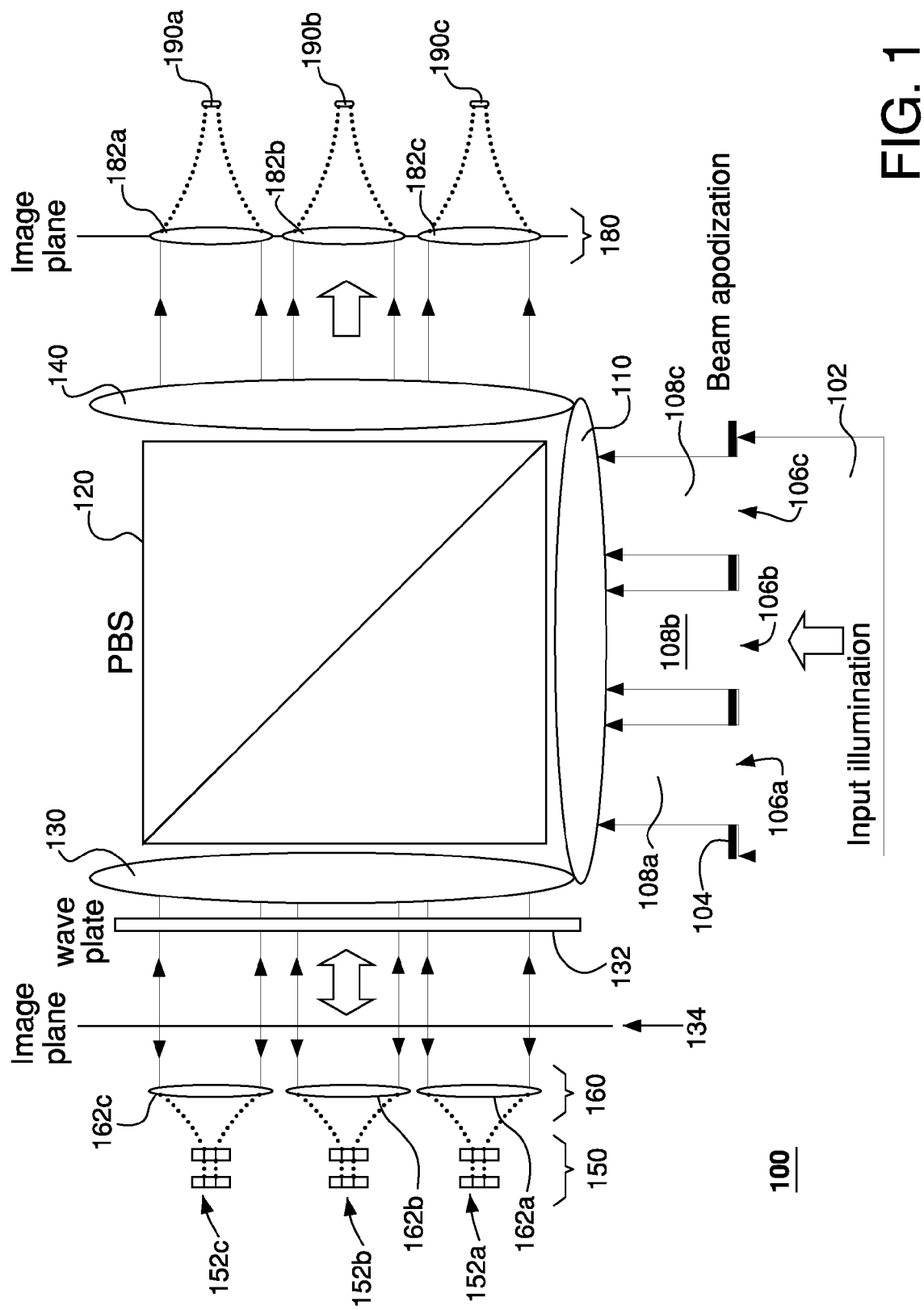
FIG. 1 schematically shows an optical system according to one embodiment of the invention.

FIG. 1 schematically shows an optical system 100 according to one embodiment of the invention. A linearly polarized, collimated optical input beam 102 (preferably having spatialy coherent light) enters system 100 through a mask 104 having a plurality of apertures 106, each defining a light source for the generation of a corresponding optical spot 190. Illustratively, mask 104 is shown as having three apertures 106a-c configured to pass light for three optical spots 190a-c, respectively, although, in a different embodiment, a different mask having a different number of apertures can similarly be used. In one embodiment, each aperture 106 is a uniformly transparent circle in a sheet of opaque material. In another embodiment, each aperture 106 has a non-uniform grayscale transmission pattern (also known as beam apodization). This pattern spatially modulates a transmitted light beam 108, thereby affecting spatial light distribution across the corresponding spot 190. Although, in FIG. 1, mask 104 is shown as having a linear array of apertures, in a different embodiment, the mask can have a two-dimensional array of apertures, one dimension of which array would be orthogonal to the plane of FIG. 1.

The illumination pattern created at the backside of mask 104 is imaged onto a spatial light modulator (SLM) 150 using a telecentric imaging system having lenses 110 and 130, and optionally a polarization beam splitter (PBS) 120 or a regular beam splitter. More specifically, each beam 108 is directed by lens 110, PBS 120, and lens 130 to a corresponding pixel (elemental device unit) 152 of SLM 150. Pixel 152 then reflects the received light back toward lens 130, with the amplitude and phase of the reflected light controlled by the pixel settings as described in more detail below. The reflected light is imaged using telecentric imaging system having lenses 130 and 140. Lenses 130 and 140 then image the reflected light onto an array 180 of microlenses 182, which focus the light and form spots 190. Note that an optional polarization rotation performed by a wave plate 132 enables PBS 120 to transmit the reflected light toward lens 140 instead of directing it back toward lens 110. Alternatively, a regular beam splitter can accomplish the same imaging characteristic, albeit at a significant power loss. An optional array 160 of microlenses 162 can be placed between wave plate 132 and SLM 150 to reduce optical losses in the SLM. More specifically, each microlens 162 reduces the beam cross-section at the corresponding pixel 152, thereby decreasing (or eliminating) a typically present mismatch between the beam size and the lateral size of the reflective element in the pixel.

To make system 100 relatively compact, the telecentric imaging system has a folded configuration, due to which lens 130 and PBS 120 are traversed twice en route from mask 104 to spots 190. Lenses 110 and 130 are configured to produce an image of mask 104 at an image plane 134. Lenses 130 and 140 then image the light returned to image plane 134 by SLM 150 onto array 180. Accordingly, the ratio of the focal lengths of lenses 110 and 130 is chosen so as to appropriately magnify/de-magnify the pitch (i.e., the spatial period) of apertures 106 in mask 104 to match the pitch of pixels 152 in SLM 150, while the ratio of the focal lengths of lenses 130 and 140 are chosen so as to appropriately magnify/de-magnify the pitch of the pixels to obtain a desired pitch for spots 190.

In a typical configuration, the imaging performed in system 100 preserves the input-beam apodization provided by mask 104. As a result, the spatial mode at each spot 190 is a Fourier transform of the field profile at the backside of the corresponding aperture 106. Hence, for a uniformly transparent circular aperture, the intensity profile at spot 190 is described by a radial Bessel function (characterized by a decaying ringing pattern). A grayscale transmission pattern for aperture 106 can advantageously reduce or even eliminate this ringing. For example, a Gaussian transmission pattern can produce a substantially Gaussian lit spot 190. Furthermore, other appropriate transmission patterns can be used to create other desirable intensity profiles at spots 190. For example, one such profile is an intensity distribution that induces a trapped ion in a qubit processor to acquire a particular angular-momentum value/orientation.

In one embodiment, each pixel 152 of SLM 150 has a Fabry-Perot cavity formed by two parallel plates (with the cavity being the volume between the plates). The first plate is a semitransparent plate that admits part of the incident light into the cavity, while reflecting back the remaining part. The second plate is a mirror that reflects the admitted light back toward the first plate. The amplitude of the light reflected by the cavity is controlled by the distance between the plates whereas its phase is controlled by the position of the cavity as a whole with respect to a reference plane, e.g., image plane 134. More specifically, when the separation between the first and second plates produces destructive interference between the light reflected by the first plate and the light reflected by the second plate, then the intensity of the light reflected by the entire cavity can substantially be canceled. Alternatively, when the separation between the first and second plates produces constructive interference between the light reflected by the first plate and the light exiting the cavity after being reflected by the second plate, then the intensity of the light reflected by the entire cavity is at a maximum. One skilled in the art will appreciate that various distances between the first and second plates result in intensities of the reflected light that fall between these minimum and maximum intensities.

To access the full range of reflected intensities (from the minimum intensity to the maximum intensity), each pixel 152 is designed to be able to change the distance between the first and second plates by at least $\lambda/4$, where $\lambda$ is the wavelength of input optical beam 102. Similarly, to access the full range of relative phases (from 0 to $2\pi$), each pixel 152 is designed to be able to translate its entire cavity by at least $\lambda/2$. In one embodiment, the first and second plates forming the cavity in pixel 152 are formed using two silicon nitride (SiN) films, each having a thickness of $\lambda/4n_{SiN}$, where $n_{SiN}$ is the index of refraction of silicon nitride. For example, for $\lambda=0.5$ μm, this embodiment uses a pair of SiN films, each about 61 nm-thick, and is able to adjust the cavity size by at least 0.125 μm and translate the entire cavity by at least 0.25 μm.

Although system 100 has been described in reference to an exemplary configuration utilizing linearly polarized light with an optional PBS and a waveplate, one skilled in the art will appreciate that this system can also be adapted to work with non-polarized light, as described above, with a regular beam splitter. More specifically, to enable system 100 to spatially separate the incident and reflected light in a non-lossy fashion, the relative orientations of mask 104, SLM 150, and the telecentric imaging system can be altered such that each pixel 152 is illuminated at an angle other than 90 degrees. If the angle deviation from 90 degrees is sufficiently large, then the incident and reflected beams are separable at a sufficient distance, thereby enabling system 100 to operate without wave plate 132 and/or PBS 120.

Figure 2:
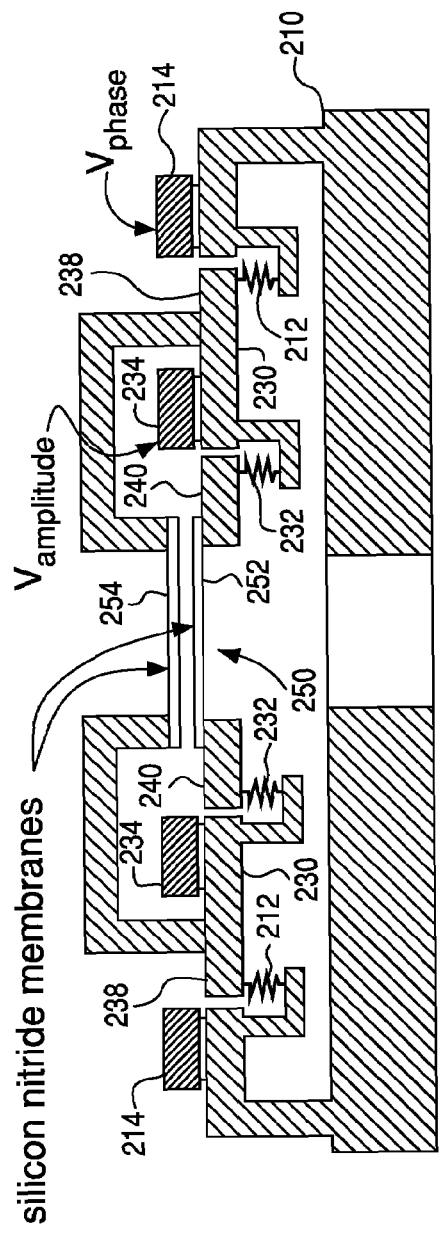
FIG. 2 shows a schematic side cross-sectional view of a MEMS device that can be used as each pixel of the spatial light modulator (SLM) employed in the optical system of FIG. 1 according to one embodiment of the invention.

FIG. 2 shows a side cross-sectional view of a MEMS device 200 that can be used as each pixel 152 according to one embodiment of the invention. Device 200 has a cylindrical cavity 250 formed by circular SiN films 252 and 254, which function as the two parallel plates of a Fabry-Perot cavity. Cavity 250 is supported on a platform 230, which is movably connected by springs 212 to a base 210 of device 200. Electrodes 214, which are rigidly attached to but electrically isolated from base 210, and sides 238 of platform 230 form a first fringe-field actuator in device 200. When electrodes 214 are electrically biased with respect to platform 230, an electrostatic force generated between those electrodes and sides 238 pulls the platform up toward the position in which the sides would be aligned with the electrodes. The displacement of platform 230 deforms springs 212, which produce spring forces counteracting the electrostatic force. When the electrical bias is removed, the spring forces return platform 230 back to the position shown in FIG. 2. Thus, application of a bias voltage to electrodes 214 results in a translation of cavity 250 as a whole with respect to base 210, with the translation distance controlled by the magnitude of the bias voltage.

Since film 254 is fixedly attached to platform 230, that film moves together with the platform. In contrast, film 252 is mounted on a platform 240, which is movably connected by springs 232 to platform 230. As a result, film 252 can move together with platform 230 with respect to base 210 as well as together with platform 240 with respect to platform 230. The sides of platform 240 and electrodes 234, which are rigidly attached to but electrically isolated from platform 230 form a second fringe-field actuator in device 200. Note that platform 230 has a structure located between electrodes 214 and 234 and shaped so as to provide electrical shielding between those electrodes, thereby reducing crosstalk between the first and second fringe-field actuators. When electrodes 234 are electrically biased with respect to platform 240, the resulting electrostatic force pulls that platform up toward the position in which its sides would be aligned with electrodes 234, while the deformation of springs 232 provides a counteracting spring force. When the electrical bias is removed, the spring force returns platform 240 back to the position shown in FIG. 2. Thus, application of a bias voltage to electrodes 234 results in a separation change for films 252 and 254, with the magnitude of the change controlled by the magnitude of that bias voltage. When device 200 is used in pixel 152 of system 100 (FIG. 1), voltage $V_{amplitude}$ (see FIG. 2) applied to electrodes 234 controls the intensity of light reflected by pixel 152, while voltage $V_{phase}$ (see FIG. 2) applied to electrodes 214 controls the phase of light reflected by pixel 152, e.g., at image plane 134.

Figure 3:
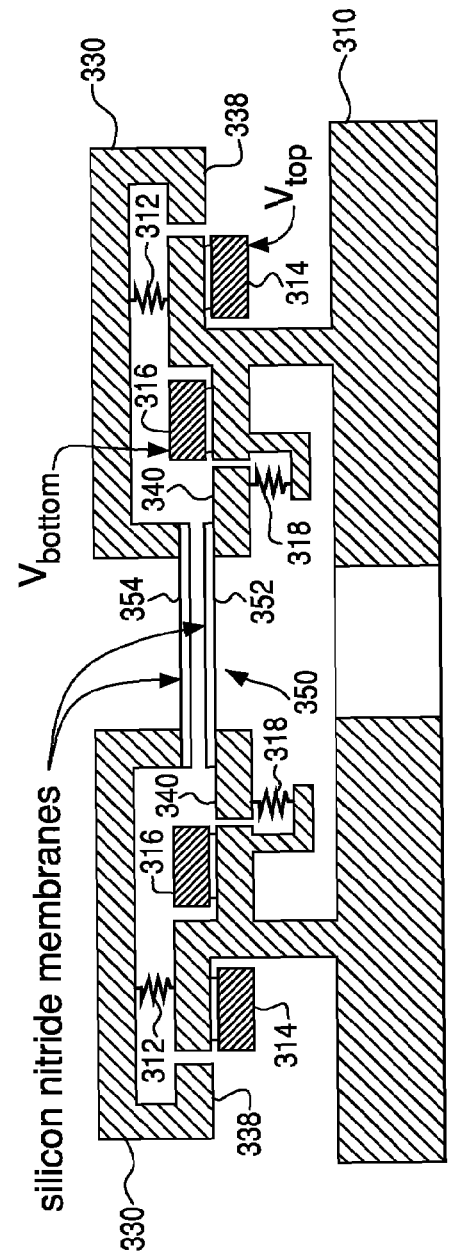
FIG. 3 shows a schematic side cross-sectional view of a MEMS device that can be used as each pixel of the SLM employed in the optical system of FIG. 1 according to another embodiment of the invention.

FIG. 3 shows a side cross-sectional view of a MEMS device 300 that can be used as each pixel 152 according to another embodiment of the invention. Device 300 is generally analogous to device 200 (FIG. 2). As such, device 300 has a cylindrical cavity 350 formed by circular SiN films 352 and 354. However, one difference between devices 200 and 300 is that, in the former, one movable platform (i.e., platform 230) supports both SiN films while, in the latter, each film is supported by a dedicated independently movable platform. More specifically, film 354 is supported on a platform 330, which is movably connected by springs 312 to a base 310 of device 300. Sides 338 of platform 330 and electrodes 314, which are attached to base 310, form a first fringe-field actuator in device 300. When electrodes 314 are electrically biased with respect to platform 330, an electrostatic force generated between those electrodes and sides 338 pulls the platform down toward the position in which the sides would be aligned with the electrodes. The displacement of platform 330 deforms springs 312, which produce spring forces counteracting the electrostatic force. When the electrical bias is removed, the spring forces return platform 330 back to the position shown in FIG. 3.

Similarly, film 352 is supported on a platform 340, which is movably connected by springs 318 to base 310. The sides of platform 340 and electrodes 316, which are attached to base 310, form a second fringe-field actuator in device 300. When electrodes 316 are electrically biased with respect to platform 340, an electrostatic force generated between those electrodes and the platform pulls the platform up toward the position in which the platform would be aligned with the electrodes. The displacement of platform 340 deforms springs 318, which produce spring forces counteracting the electrostatic force. When the electrical bias is removed, the spring forces return platform 340 back to the position shown in FIG. 3.

It is clear from the above description that voltages $V_{top}$ and $V_{bottom}$ (see FIG. 3) applied to electrodes 314 and 316, respectively, independently control the motion of films 354 and 352 with respect to base 310. As such, when device 300 is used in pixel 152 of system 100 (FIG. 1), both $V_{top}$ and $V_{bottom}$ are adjusted when an adjustment of the phase for the light reflected by pixel 152 is being performed.

Figure 4D:
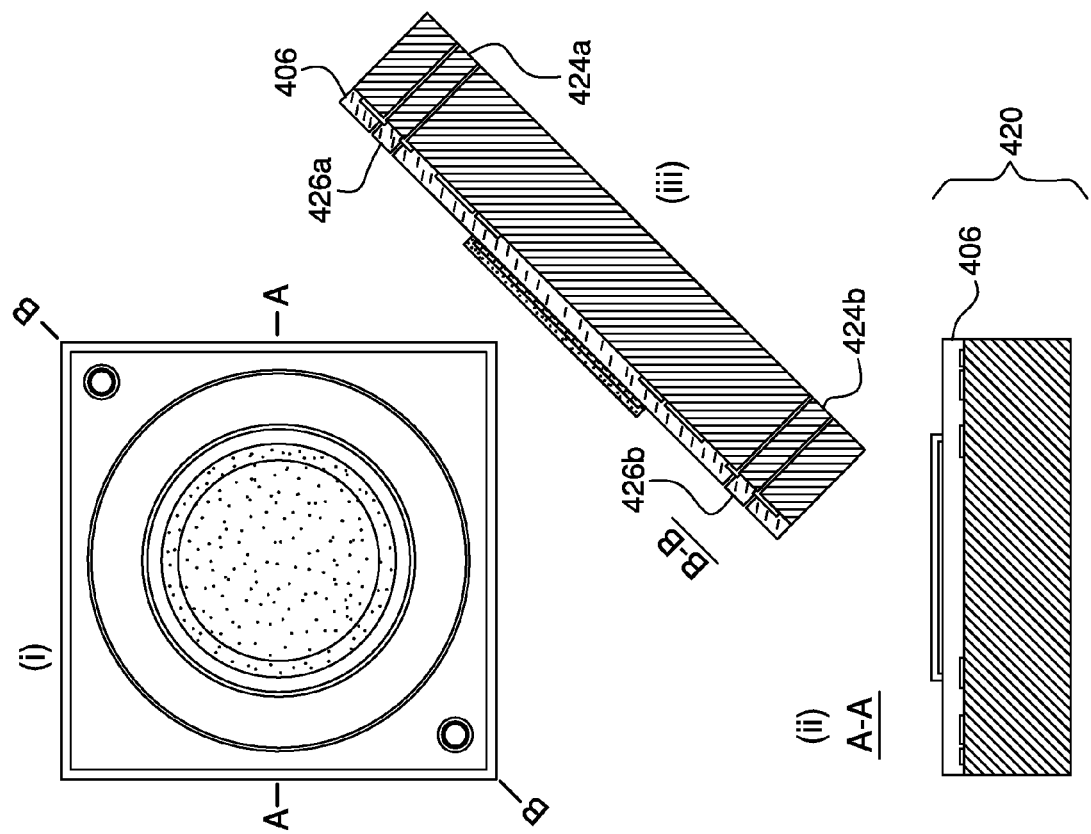
Figure 4C:
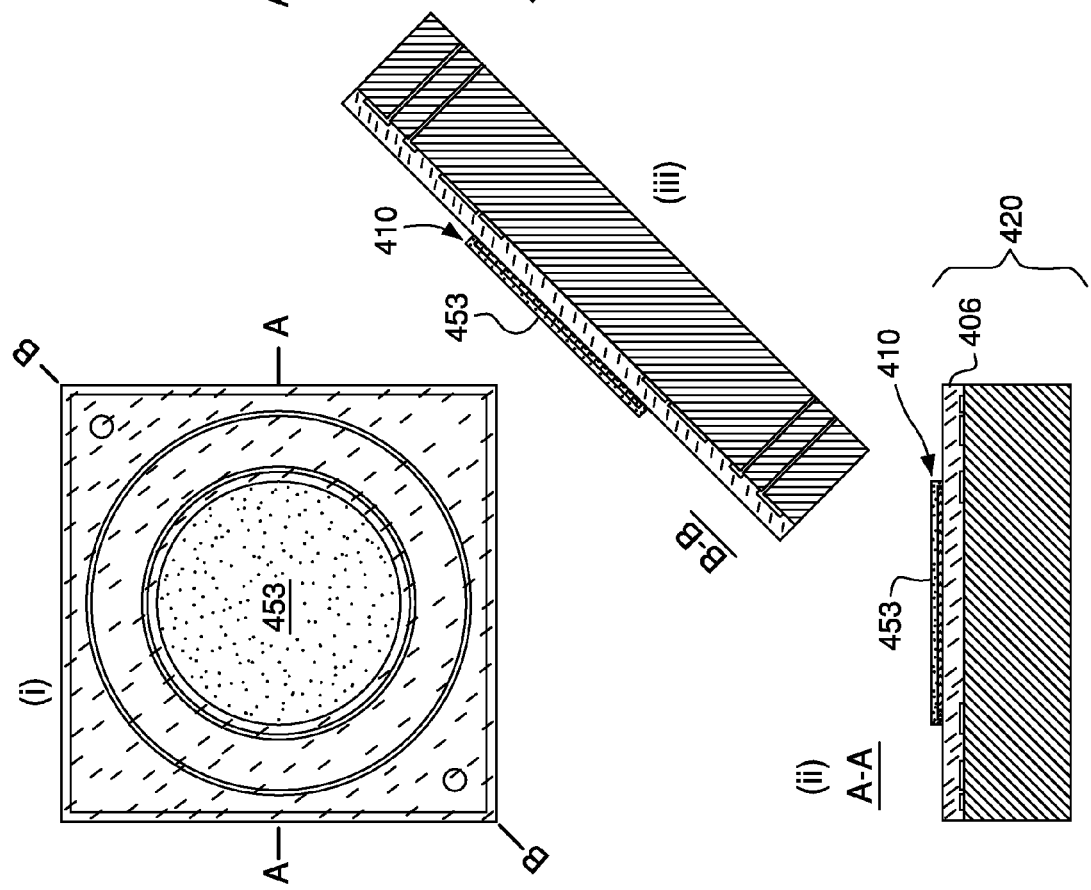
Figure 4H:
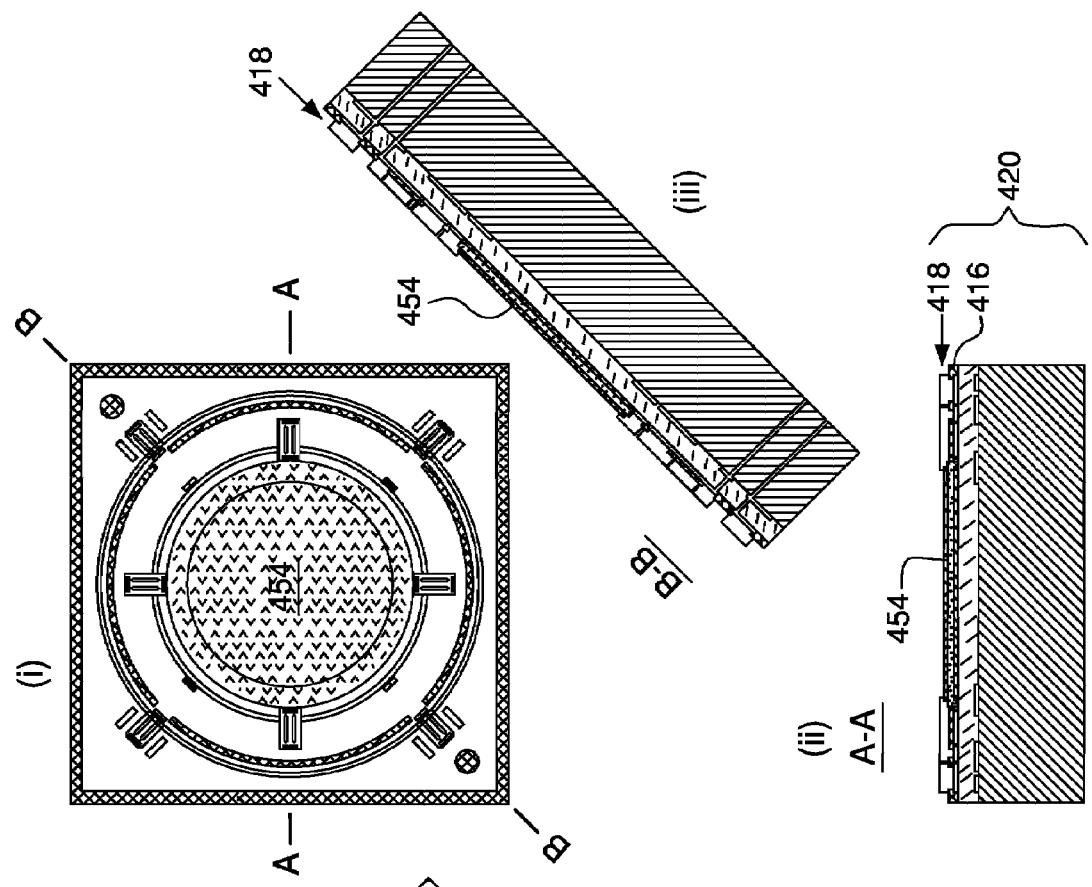
Figure 4G:
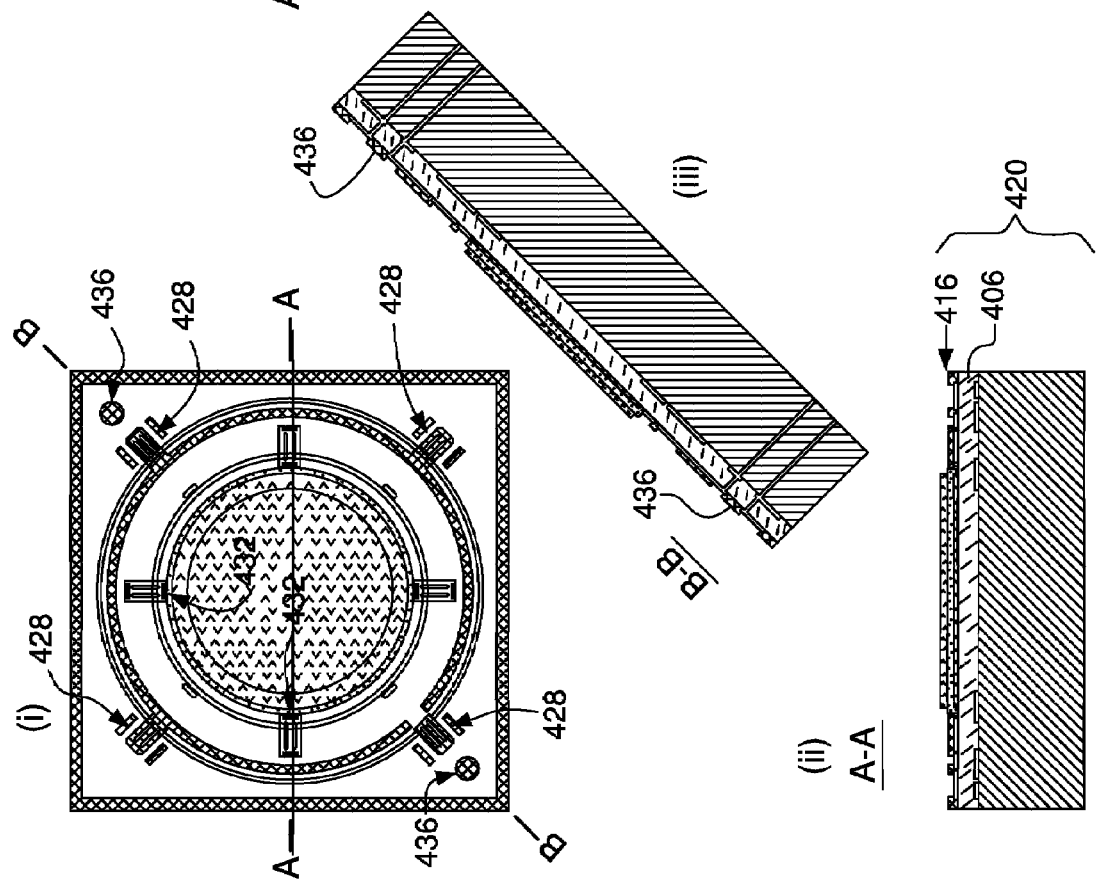
Figure 4K:
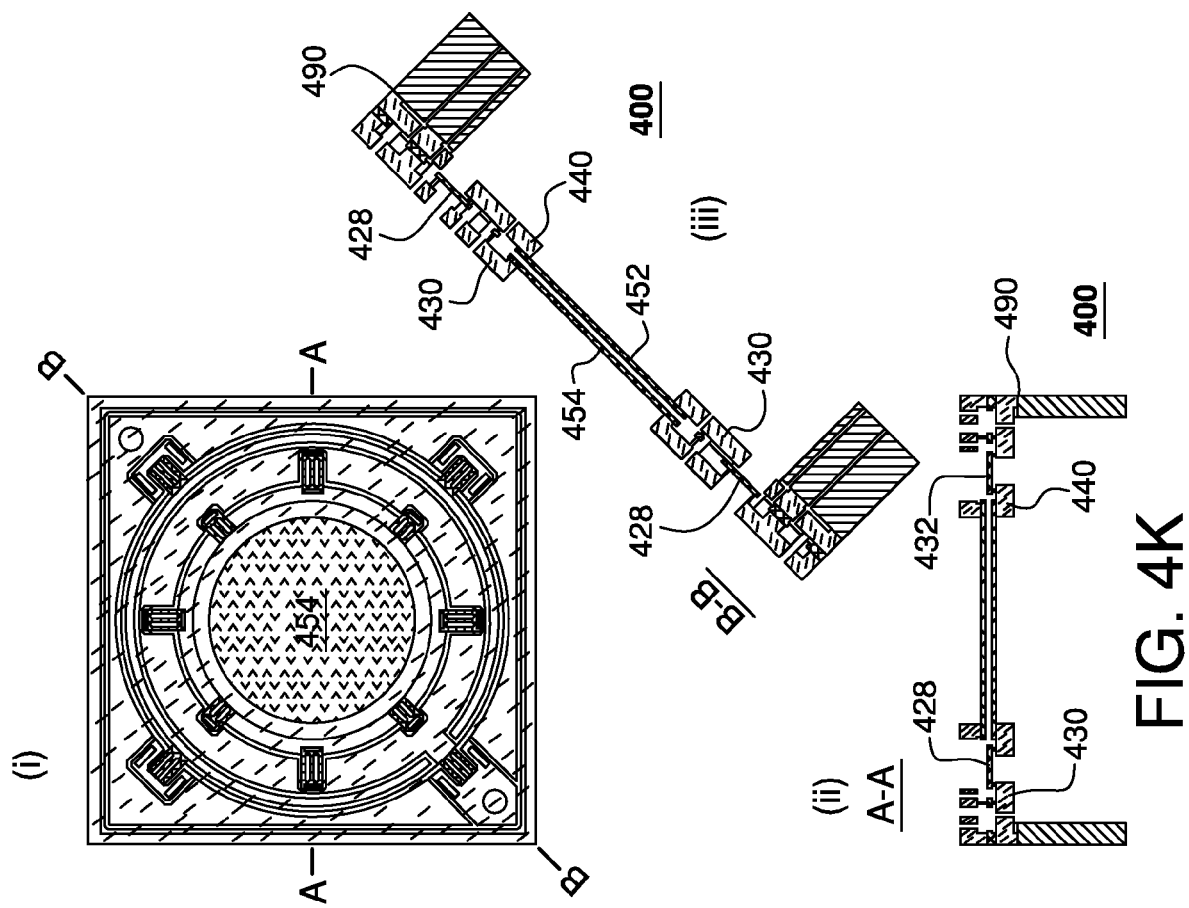

FIGS. 4A-K schematically illustrate representative fabrication steps for a MEMS device 400 that can be used as each pixel 152 according to yet another embodiment of the invention. More specifically, each of FIGS. 4A-K shows three views labeled (i), (ii), and (iii), respectively. Each view (i) is a top view of a multilayered wafer, using which device 400 is being fabricated, at the corresponding fabrication step, whereas views (ii) and (iii) are the corresponding cross-sectional side views along the planes designated AA and BB in the top-view figure. The fabrication method outlined by FIGS. 4A-K is similar to the method described in U.S. Patent Application Publication No. US 2006/0228896 A1, entitled "Fabricating Integrated Devices Using Embedded Masks," which is incorporated herein by reference in its entirety. The final structure of device 400 is shown in FIG. 4K. Note that device 400 is analogous to device 200 of FIG. 2 in that it has a movable platform that supports both SiN films and enables translation of the cavity formed by the films as a whole via translation of that platform.

Referring to FIGS. 4A(i)-(iii), fabrication of MEMS device 400 begins with wafer 420 having a silicon substrate layer 402. First, a silicon-oxide layer 404 is deposited over substrate layer 402. Then, layer 404 is patterned and etched to form a mask 444 that will partially define the shapes of the two (not-yet-formed) movable platforms that are analogous to platforms 230 and 240 of device 200 (see FIG. 2). Two small circular openings 422a-b in mask 444 provide access to two underlying through-wafer vias 424a-b, respectively. These vias can be used, e.g., for providing electrical connections between various layers of wafer 420 and/or electrical pathways to various electrodes (not shown for clarity).

Referring to FIGS. 4B(i)-(iii), a poly-silicon layer 406 is deposited over mask 444 and layers 402 and 404. After the deposition of layer 406, mask 444 becomes buried under that layer. Next, a silicon-nitride layer 408 is deposited over layer 406. Layer 408 is then patterned and etched to form a disk-shaped film 452 that is analogous to film 252 of FIG. 2. In one embodiment, the thickness of layer 408 is an odd multiple of $\lambda/4n_{SiN}$. Since the desirable maximum displacement of film 452 is $\lambda/2$ (=0.25 μm for $\lambda$=500 nm), the thickness of the platform that supports film 452 in device 400 can be less than 1 μm. However, it might be advantageous to use layer 406 (from which that platform is formed) of a greater thickness to add mechanical strength to the platform and enable it to resist the warping forces imparted by the typically present tensile stress of film 452. It might further be advantageous to employ a silicon-nitride deposition method that results in a relatively low stress in film 452, e.g., lower than about 50 MPa.

Referring to FIGS. 4C(i)-(iii), a fast-etching phosphoro-silicate glass (PSG) layer 410 is deposited over film 452 and layer 406. Layer 410 is patterned and etched to create a central disk 453 having an area that is slightly larger than that of film 452. The etching of layer 410 automatically stops at layer 406. The thickness of disk 453 over film 452 sets the spacing between the two SiN films (i.e., film 452 and a not-yet-formed film 454, see FIG. 4F) that define the Fabry-Perot cavity of device 400.

Referring to FIGS. 4D(i)-(iii), layer 406 is patterned and etched to form electrically isolated posts 426a-b over through-wafer vias 424a-b, respectively.

Referring to FIGS. 4E(i)-(iii), a thermal oxide layer 412 is grown over layer 406. Note that the material of layer 412 fills up the trenches in layer 406 that define posts 426, while leaving the surface of disk 453 exposed.

Referring to FIGS. 4F(i)-(iii), first, a silicon-nitride layer 414 is deposited over the structure shown in FIG. 4E. Next, layer 414 is patterned and etched to form film 454. Note that the etching of layer 414 stops automatically at oxide layer 412 or PSG disk 453. Finally, oxide layer 412 is patterned and etched as shown in FIG. 4F(i) to expose certain regions of layer 406.

Referring to FIGS. 4G(i)-(iii), first, a thin poly-silicon layer 416 is deposited over the structure shown in FIG. 4F. Next, layer 416 is patterned and etched (with the etching stopping automatically at layer 414, PSG disk 453, or layer 412) to create beam-shaped springs 428 and 432. Note that springs 428 are functionally analogous to springs 212, while springs 432 are functionally analogous to springs 232 (see FIG. 2). Springs 428 and 432 have a slotted multi-beam shape to aid the final release process of the springs (see also FIGS. 4J-K). Additional structural features created in layer 416 are covers 436 for posts 426.

Referring to FIGS. 4H(i)-(iii), first, an oxide layer 418 is deposited over the structure shown in FIG. 4G. Next, layer 418 is patterned and etched to expose film 454. Finally, layer 418 is patterned and etched as shown in FIG. 4H(i) to expose certain regions of layer 416.

Referring to FIGS. 4I(i)-(iii), first, a poly-silicon layer 419 is deposited over the structure shown in FIG. 4H. Next, an oxide layer 421 is deposited over layer 419. Then, layer 421 is patterned and etched to create a mask 464 that will partially define the shape of the (not-yet-formed) movable platform analogous to platform 230 in device 200 (see FIG. 2). Note that, to define some of the features to be created in layer 419 and to aid the final release, it might be advantageous to utilize grid-type structures in mask 464.

Referring to FIGS. 4J(i)-(iii), first, the topside (i.e., the side having mask 464) of wafer 420 is subjected to anisotropic reactive ion etching (RIE) to remove the exposed silicon and create a complementary silicon structure in the "etch shadow" of mask 464 in layer 419. This RIE etching process stops at oxide layer 418 or film 454. Next, the backside (i.e., the side having substrate layer 402) of wafer 420 is subjected to anisotropic RIE to remove the exposed silicon and create a corresponding silicon structure in the "etch shadow" of mask 444 in layer 406. This RIE etching process stops at mask 444, oxide layer 412, or film 452.

Finally, referring to FIGS. 4K(i)-(iii), the exposed silicon oxide of masks 444 and 464 and various oxide layers and the PSG of disk 453 are etched away to release various movable parts and form the final structure of device 400. Note that a movable platform 430 connected by springs 428 to a base 490 of device 400 has been formed. Platform 430 supports both films 452 and 454 and enables motion of the cavity defined by those films as a whole in a manner similar to that of platform 230 in device 200 (see FIG. 2). In addition, a movable platform 440 connected by springs 432 to platform 430 has been formed. Platform 440 supports film 452 and enables motion of that film with respect to platform 430 and film 454 in a manner similar to that of platform 240 in device 200.

Figure 5:
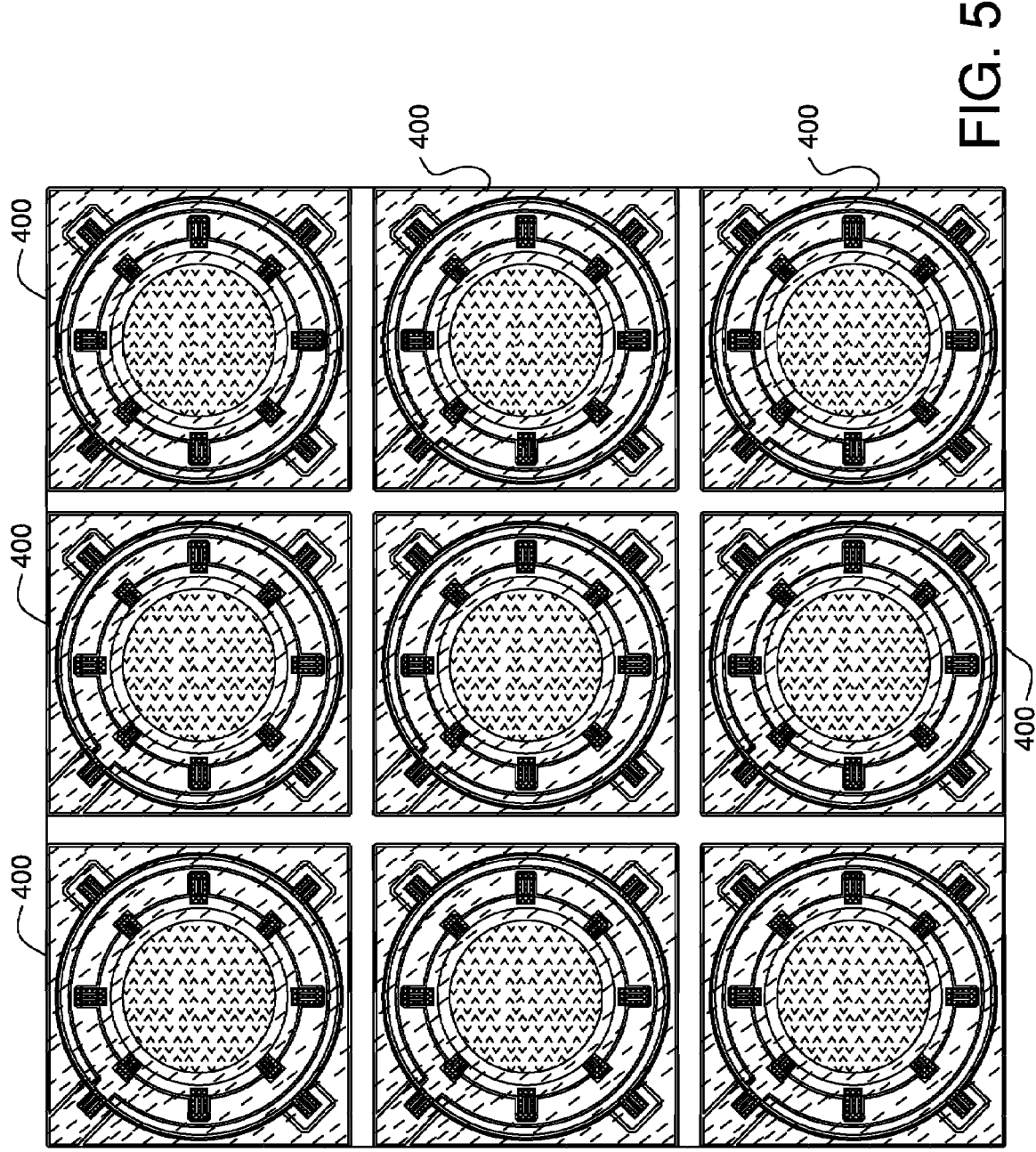
FIG. 5 shows a top view of an SLM that can be used in the optical system of FIG. 1 according to one embodiment of the invention.

FIG. 5 shows a top view of an SLM 500 that can be used as SLM 150 of FIG. 1 according to one embodiment of the invention. SLM 500 is an arrayed MEMS device having nine pixels, with each pixel being a copy of device 400 (see FIG. 4K). Note that devices 400 in device 500 form a two-dimensional array that lends itself to relatively straightforward modification (e.g., through pixel addition along either one or both lateral directions) for the formation of arrays having various sizes and shapes suitable for use in different embodiments of system 100 (FIG. 1).

While this invention has been described with reference to illustrative embodiments, this description is not intended to be construed in a limiting sense. For example, MEMS devices 200, 300, and 400 can be used in various geometric configurations and/or systems incorporating Fabry-Perot cavities. Various surfaces may be modified, e.g., by metal deposition for enhanced reflectivity and/or electrical conductivity or by ion implantation for enhanced mechanical strength. Differently shaped platforms, plates, posts, films, disks, beams, bars, electrodes, and/or actuators may be implemented without departing from the scope and principle of the invention. Springs may have different shapes and sizes, where the term "spring" refers in general to any suitable elastic structure that can recover its original shape after being distorted. Devices and systems of the invention can be configured to operate with CW or pulsed light. Integrated devices of the invention can be formed using one, two or more wafers secured together. One example of an integrated device is a MEMS device. Another example of an integrated device is a device having movable portions and control electronics fabricated using the same wafer. Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, Microsystems, and devices produced using microsystems technology or microsystems integration.

Although the present invention has been described in the context of implementation as MEMS devices, the present invention can in theory be implemented at any scale, including scales larger than micro-scale.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. Apparatus, comprising a device having one or more elemental device units, wherein each unit comprises:

first and second films movably coupled to a base, said first and second films being arranged to define a tunable cavity, wherein:

the first film is adapted to be moved with respect to the base; and the second film is adapted to be moved with respect to the base and with respect to the first film, wherein the device is a spatial light modulator (SLM), wherein, for each unit, the tunable cavity is adapted to receive an optical input beam and form a reflected beam having an amplitude and a phase, wherein each unit is adapted to: (i) change the amplitude by changing separation between the first and second films and (ii) change the phase by changing position of the cavity with respect to the base.

2. The invention of claim 1, wherein the first and second films are substantially parallel to one another.

3. The invention of claim 1, wherein:

the cavity is a Fabry-Perot cavity;

the first film is adapted to admit light into the cavity; and the second film has a reflective surface adapted to reflect the admitted light back toward the first film.

4. The invention of claim 1, wherein the device further comprises:

a first platform adapted to move with respect to the base, wherein the first film is fixedly attached to the first platform; and a second platform adapted to move with respect to the base independent of the first platform, wherein the second film is fixedly attached to the second platform.

5. The invention of claim 4, wherein the device further comprises:

a first electrode fixedly attached to and electrically isolated from the base, wherein the first platform and the first electrode form a first fringe-field actuator adapted to move the first platform with respect to the base in response to a bias voltage applied to said first actuator; and a second electrode fixedly attached to and electrically isolated from the base, wherein the second platform and the second electrode form a second fringe-field actuator adapted to move the second platform with respect to the base in response to a bias voltage applied to said second actuator.

6. The invention of claim 5, wherein the base has structure adapted to provide electrical shielding between the first and second electrodes.

7. The invention of claim 1, wherein the device further comprises:

a first platform adapted to move with respect to the base, wherein the first film is fixedly attached to the first platform; and a second platform mounted on the first platform and adapted to move with respect to the first platform, wherein the second film is fixedly attached to the second platform.

8. The invention of claim 7, wherein the device further comprises:

a first electrode fixedly attached to and electrically isolated from the base, wherein the first platform and the first electrode form a first fringe-field actuator adapted to move the first platform with respect to the base in response to a bias voltage applied to said first actuator; and a second electrode fixedly attached to and electrically isolated from the first platform, wherein the second platform and the second electrode form a second fringe-field actuator adapted to move the second platform with respect to the first platform in response to a bias voltage applied to said second actuator.

9. The invention of claim 8, wherein the first platform has a structure adapted to provide electrical shielding between the first and second electrodes.

10. The invention of claim 1, further comprising:

an optical mask adapted to pass light received from an optical source to form one or more optical input beams; and an imaging system adapted to (i) direct each optical input beam to a respective unit and (ii) direct each reflected beam to form a respective optical spot.

11. The invention of claim 10, further comprising:

a polarization beam splitter (PBS) adapted to direct the one or more input beams from the mask to the SLM; and a wave plate adapted to introduce a polarization rotation, which configures the PBS to direct the one or more reflected beams away from the mask and cause each optical spot to be spatially separated from the corresponding input beam.

12. The invention of claim 10, wherein the mask comprises a sheet of material having a plurality of apertures, each aperture defining the respective input beam, wherein each aperture comprises a transmission pattern adapted to spatially modulate the input beam to create a desired intensity profile at the respective spot.

13. The invention of claim 10, wherein:

the optical mask is a planar mask; and the imaging system is adapted to form a two-dimensional optical spot array within a plane orthogonal to the plane of the mask.

14. The invention of claim 1, wherein at least two units have a common base.

15. Apparatus, comprising a device having one or more elemental device units, wherein each unit comprises:

means for moving a first film with respect to a base; and means for moving a second film with respect to said base and with respect to said first film, wherein said first and second films are parts of said unit and are movably coupled to said base to define a tunable cavity, wherein the device is a spatial light modulator (SLM), wherein, for each unit, the tunable cavity is adapted to receive an optical input beam and form a reflected beam having an amplitude and a phase, wherein each unit is adapted to: (i) change the amplitude by changing separation between the first and second films and (ii) change the phase by changing position of the cavity with respect to the base.

16. Apparatus, comprising a device having one or more elemental device units, wherein each unit comprises:

first and second films movably coupled to a base, said first and second films being arranged to define a tunable cavity, wherein:

the first film is adapted to be moved with respect to the base; and the second film is adapted to be moved with respect to the base and with respect to the first film, wherein the device further comprises:

a first platform adapted to move with respect to the base, wherein the first film is fixedly attached to the first platform; and a second platform mounted on the first platform and adapted to move with respect to the first platform, wherein the second film is fixedly attached to the second platform.

17. The invention of claim 16, wherein the device further comprises:

a first electrode fixedly attached to and electrically isolated from the base, wherein the first platform and the first electrode form a first fringe-field actuator adapted to move the first platform with respect to the base in response to a bias voltage applied to said first actuator; and a second electrode fixedly attached to and electrically isolated from the first platform, wherein the second platform and the second electrode form a second fringe-field actuator adapted to move the second platform with respect to the first platform in response to a bias voltage applied to said second actuator.

18. The invention of claim 17, wherein the first platform has a structure adapted to provide electrical shielding between the first and second electrodes.

* * * * *

UNITED STATES PATENT AND TRADEMARK OFFICE
CERTIFICATE OF CORRECTION

| | | |
|---|---|---|
| PATENT NO. | : 7,468,828 B2 | Page 1 of 1 |
| APPLICATION NO. | : 11/550867 | |
| DATED | : December 23, 2008 | |
| INVENTOR(S) | : Dennis S. Greywall and Dan M. Marom | |

It is certified that error appears in the above-identified patent and that said Letters Patent is hereby corrected as shown below:

On the cover page, in section (75), replace "IL" with --Israel--.

Signed and Sealed this

Twenty-first Day of April, 2009

JOHN DOLL
*Acting Director of the United States Patent and Trademark Office*